(12) United States Patent
Neveu et al.

(10) Patent No.: US 11,938,786 B2
(45) Date of Patent: Mar. 26, 2024

(54) SYSTEM FOR MANAGING THE THERMAL COMFORT OF A PERSON

(71) Applicant: Valeo Systemes Thermiques, Le Mesnil Saint-Denis (FR)

(72) Inventors: Daniel Neveu, Le Mesnil Saint-Denis (FR); Jeremie Zoubairi, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 302 days.

(21) Appl. No.: 17/603,468

(22) PCT Filed: Apr. 14, 2020

(86) PCT No.: PCT/EP2020/060497
§ 371 (c)(1),
(2) Date: Oct. 13, 2021

(87) PCT Pub. No.: WO2020/212366
PCT Pub. Date: Oct. 22, 2020

(65) Prior Publication Data
US 2022/0203805 A1      Jun. 30, 2022

(30) Foreign Application Priority Data
Apr. 19, 2019   (FR) ...................................... 1904231

(51) Int. Cl.
*B60H 1/00*      (2006.01)
*G06V 10/764*    (2022.01)
(Continued)

(52) U.S. Cl.
CPC ....... *B60H 1/00742* (2013.01); *B60H 1/0073* (2019.05); *G06V 10/764* (2022.01);
(Continued)

(58) Field of Classification Search
CPC .............. B60H 1/00742; B60H 1/0075; G06V 10/764; G06V 10/82; G06V 20/59; G06V 20/597; G06V 40/10
See application file for complete search history.

(56) References Cited

U.S. PATENT DOCUMENTS 5,145,112 A     9/1992  Ueda
5,291,748 A *   3/1994  Ueda ................... B60H 1/00742
                                                       236/78 D
(Continued)

FOREIGN PATENT DOCUMENTS

CN       104966123 A     10/2015
CN       106663411 A     5/2017
(Continued)

OTHER PUBLICATIONS

International Search Report and Written Opinion in corresponding International Application No. PCT/EP2020/060497, dated Jul. 17, 2020 (10 pages).

(Continued)

*Primary Examiner* — Jonathan Bradford
(74) *Attorney, Agent, or Firm* — Osha Bergman Watanabe & Burton LLP

(57) ABSTRACT

The present invention relates to a system (1) for managing the thermal comfort of a person, in particular on board a motor vehicle, this system being designed to use at least one state characteristic of the person and/or of their thermal environment, this characteristic being able to adopt a plurality of values, this system being designed to: acquire, using a sensor, data relating to the person and/or to their thermal environment, this sensor being in particular a camera designed to acquire an image of the person and/or of their thermal environment, evaluate, on the basis of these acquired data, the probability of the state characteristic (Continued)

adopting a first value by associating a first confidence level with this first value.

10 Claims, 1 Drawing Sheet

(51) Int. Cl.
  *G06V 10/82* (2022.01)
  *G06V 20/59* (2022.01)
  *G06V 40/10* (2022.01)

(52) U.S. Cl.
  CPC .............. *G06V 10/82* (2022.01); *G06V 20/59* (2022.01); *G06V 40/10* (2022.01)

(56) References Cited

U.S. PATENT DOCUMENTS

| | | | |
|---|---|---|---|
| 7,962,441 B2 | 6/2011 | Kojima et al. | |
| 2019/0077217 A1 | 3/2019 | Yu et al. | |

FOREIGN PATENT DOCUMENTS

| | | |
|---|---|---|
| CN | 108449791 A | 8/2018 |
| WO | 2007057857 A1 | 5/2007 |
| WO | 2018/229384 A1 | 12/2018 |

OTHER PUBLICATIONS

Office Action issued in corresponding Chinese Patent Application No. 202080017015.2, dated Nov. 29, 2023 (19 pages).

\* cited by examiner

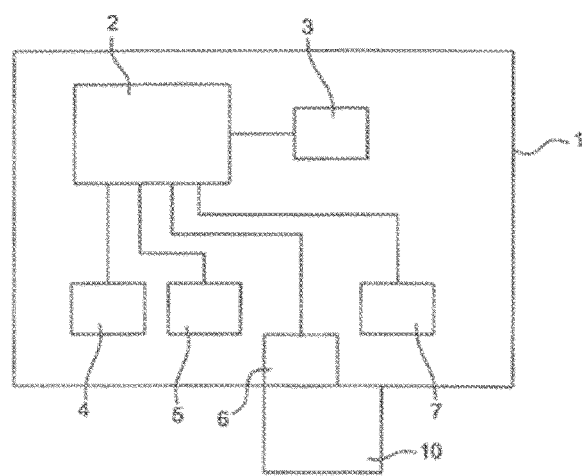

SYSTEM FOR MANAGING THE THERMAL COMFORT OF A PERSON

The present invention relates to a system for managing the thermal comfort of a person.

In a motor vehicle, it is known practice to make provision to manage flow rates, temperatures and distribution of air blown by the various ventilators depending on outside temperature and insolation conditions. In some vehicles, this may be combined with the activation of a heated steering wheel and/or of a heated or cooled seat. It is almost unknown to detect and/or take into account the thermal state of passengers, with the exception of a few examples of use of infrared sensors that detect the surface temperature of the clothes of the passengers in order to better take into account initial conditions during the temporary welcome phase (when the person is entering from a cold or hot environment) and the thermal equilibrium resulting from radiative and convective exchanges. In general, measuring the thermal state of the passenger compartment is limited to measuring air temperatures in combination with an insolation sensor. More sophisticated approaches to comfort management have been proposed, these being based on new sensors, in particular infrared cameras, and new actuators, in particular radiant panels and/or actuators allowing localized air delivery.

It is possible to define the thermal comfort of a passenger as being the sensation condition, which expresses satisfaction with the thermal environment and which is evaluated through subjective evaluation. In order to control or provide thermal comfort in the motor vehicle passenger compartment, it is desirable to estimate the metabolic activity and the clothing of the person as input data for a thermo-physiological model. The thermal sensation is the psycho-physiological expression of the thermal stress of a person, and this sensation is different for men and women. It also depends on age, clothing, time of day, etc.

Thermo-physiological models that describe the thermal comfort of a person, such as the Fanger model, take into account in particular the level of clothing in the calculation of heat exchanges.

The result of gender detection is usually binary, that is to say Male or Female. Likewise, the classification of clothing is often limited to a few clothing levels, such as swimsuit, summer clothing, casual wear for the home, winter clothing.

Due to limitations linked to the noise of the one or more sensors and the recognition algorithm, there may be jumps from one state to another, which may destabilize the comfort prediction. In some cases, the profile or the state of the occupant cannot be linked to a predominant gender category, as people generally have male and female characteristics. The same applies to intermediate clothing levels. This problem of categorizing the profile or the state of a person also applies to other characteristics, such as the emotional state or the activity of passengers.

The invention aims to improve the management of the comfort of a motor vehicle passenger.

One subject of the invention is thus a system for managing the thermal comfort of a person, in particular on board a motor vehicle, this system being designed to use at least one state characteristic of the person and/or of their thermal environment, this characteristic being able to adopt a plurality of values, these values being discrete or continuous, this system being designed to:

a. acquire, using a sensor, data relating to the person and/or to their thermal environment, this sensor being in particular a camera designed to acquire an image of the person and/or of their thermal environment, b. evaluate, on the basis of these acquired data, the probability of the state characteristic adopting a first value by associating a first confidence level with this first value, c. evaluate, on the basis of these acquired data, the probability of the state characteristic adopting a second value by associating a second confidence level with this first value, d. assigning, to the state characteristic, an adjusted value that is a function of at least said first and second values and said associated confidence levels.

The invention thus proposes, rather than assigning a category or value for each characteristic, to evaluate a probability of a category or value, which probability is for example between 0 and 1. The set of possible categories or values may be of binary nature or be classified into categories, and the sum of the probabilities assigned to this set is preferably equal to 1, each individual probability being between 0 and 1.

In one example of the invention, it is possible to define a complementary probability as the probability of an event not occurring. This complementary probability is defined as being the 1's complement of the probability of the event occurring. For example, if the probability of an event occurring is Y, then the complementary probability of the event not occurring is 1−Y. For example: if the probability of an event is 0.80 (or 80%), the complementary probability of the event not occurring is 1−0.80=0.20 (or 20%).

By way of example, if the probability of detecting the gender as male is 60%, the chances of predicting the gender as female are 40%. The present invention takes into account the remaining probability of 40% considering all of the parameters. By taking these parameters into account, it is possible to construct a new balanced metabolism and comfort model for the prediction.

According to one aspect of the invention, in order to predict passenger comfort, it is possible to take into account various qualitative state characteristics, such as gender, type of clothing, activity, posture, emotional state, etc.

According to one aspect of the invention, the state characteristic, such as age, weight or height, may be described by a continuous regression model or be described by a set of discrete categories such as female or male for gender, through a classification algorithm, for example using a neural network or a Bayesian network to evaluate and classify each characteristic into a category.

According to one aspect of the invention, each detected category is accompanied by a confidence level that corresponds to the probability level of the detected category being the correct one.

For cases in which the classification algorithm is not fully robust, or a category may be associated with the use of various sensors or processing algorithms, or there are missing categories, or there is noise or uncertainties in the input data or the signal from the sensor, the detected category may be associated with a confidence level (or probability level) that is the highest out of all of the possible categories. The other categories thus also each have a confidence level that is lower than the highest confidence level, thereby giving information about the uncertainty related to the categorization or about a possible overlap of the profile and of the state of the passenger between the categories.

The present invention is thus based in particular on the concept of mixed categories, each mixed category being a combination of predefined categories with a weighted contribution of each constituent category on the basis of its confidence level.

According to one aspect of the invention, a passenger may be detected as male with a probability of 60% and as female with a probability of 40%. A traditional approach would have led to said passenger being classified as Male, in a binary manner.

The invention thus proposes in particular to consider that the profile and the state of the passenger, and therefore their response and their behavior, is 60% in the Male category and 40% in the Female category.

The invention makes it possible in particular to improve the robustness of the is categorization of the state characteristics of passengers by taking into account the confidence level and the probability level for each category.

Another advantage afforded by the invention is that of smoothing the comfort control strategy by avoiding a sudden change in the category classification, based on noise from the sensor or the instability of the neural model, which would lead to a sudden change in the comfort evaluation and potentially some instability in the comfort control.

The invention also makes it possible, if desirable, to introduce and use the profile/state/behavior of the passenger, which is in reality an overlap or a combination of multiple categories. For example, a person may exhibit thermo-physiological behavior that is not completely aligned with average male metabolic activity or with average female metabolic activity, but between the two. Likewise, the passenger is not necessarily able to be classified exclusively into the category "Bare arms" or "Clothed arms", but between the two if the sleeves are rolled up.

According to one aspect of the invention, if the state characteristic is a level or category of emotions, it is possible to superimpose various emotions with different confidence levels. For example, a state and a behavior may be described 30% as those of an angry person and 70% as those of a happy person, depending on the confidence level of each state.

According to one of the aspects of the invention, the state characteristic is a characteristic that may adopt multiple values, each value corresponding to a category chosen from among a plurality of categories.

According to one of the aspects of the invention, the state characteristic is a gender of the passenger that may adopt a value corresponding to a Male category and a value corresponding to a Female category.

According to one of the aspects of the invention, the state characteristic is a level of coverage of the passenger's head, which characteristic may adopt a value corresponding to a category of a bald head, a value corresponding to a category of a head with hair, a value corresponding to a category of a head with a hat, in particular.

According to one of the aspects of the invention, the state characteristic is an emotional state level of the passenger, which characteristic may adopt a value corresponding to a category of an angry state, a value corresponding to a category of a worried state, a value corresponding to a category of a happy state, for example, According to one of the aspects of the invention, the system is designed to determine a confidence level for each value of the state characteristic, in particular using one or more neural networks of the system, or a Bayesian network of the system, or any other sensor and processing algorithm.

According to one of the aspects of the invention, each confidence level is between 0 and 1; in particular the sum of the confidence levels associated with the values determined for the state characteristics is equal to 1.

According to one of the aspects of the invention, the system comprises at least one measurement chain comprising a sensor, an acquisition unit and a processing unit running an algorithm, this measurement chain being designed to provide, for the state characteristic, values, values corresponding in particular to categories, and confidence levels associated with these values.

According to one of the aspects of the invention, the system is designed to assign the measurement chain a confidence level specific to the measurement chain, this confidence level reflecting the reliability of this measurement chain to give a reliable result.

According to one of the aspects of the invention, the system comprises a plurality of measurement chains (Cj) for determining values (Aij) of the state characteristic (A), each measurement chain (Cij) being designed to give values (Aij) for the state characteristic (A) with a probability (Prob(Aij)) such that the system assigns each value (Ai) an overall confidence level (Prob(Ai)) that is a function of the confidence levels (Conf(Cj)) specific to each measurement chain and of the probabilities (Prob(Aij)) associated with each value (Aij) given by the measurement chain (CD. The overall confidence level (Prob(Ai)) may thus be expressed as follows: $Prob(Ai)=\Sigma j[Conf(Cj)*Prob(Aij)]/\Sigma[Conf(Cj)]$. If the values (Aij) of the characteristic (A) are numerical and continuous, the value (A*) assigned to the state characteristic (A) may then be expressed by $A^*=\Sigma i(Prob(Ai)*Ai)/\Sigma i (Prob(Ai))$.

According to one of the aspects of the invention, the system is designed to assign the state characteristic (E) a value (E*) described by a function (f), in particular a continuous value, which is a function of values g(Ai) adopted for each value or category (Ai) of another state characteristic (A), weighted by the overall confidence level Prob(Ai) associated with this value or category (Ai). For example, it is possible to have the formula $E^*=f([i(Prob(Ai)*g(Ai))/\Sigma i(Prob(Ai))], Bk \ldots )$, where f is a model or algorithm and Bk is one or more other state characteristics.

According to one of the aspects of the invention, the system is designed to assign the state characteristic (E) a value (E*) that is a function of values (Ei) adopted by E for each value or category (Ai), weighted by the overall confidence level Prob(Ai) associated with this value or category (Ai). For example, it is possible to have the formula $E^*=\Sigma i (Prob(Ai)*f(g(Ai), Bk))/\Sigma i (Prob(Ai))$, where f is a model or algorithm and Bk is one or more other characteristics, and Ei=f(g(Ai), Bk), g(Ai) being in particular a discrete value.

According to one example of the invention, the function g may take into account non-linearities between the value (Ai) adopted by a state characteristic (A) and its consequence on the value (Ei) via the state function f: Ei=f(Ai), in particular when the values (Ai) are discrete. For example, (A) may be the gender of a person adopting two possible values (A1 . . . Male, A2 . . . Female) and (E) may be the metabolic activity of a person, the expression of which depends on a coefficient C=g(Ai), which may adopt two discrete values (g(A1)=1, g(A2)=0.8).

Another subject of the invention is a method for managing the thermal comfort of a person, in particular on board a motor vehicle, this method using at least one state characteristic of the person and/or of their thermal environment, this characteristic being able to adopt a plurality of values, this method having the following steps:

a. acquiring, using a sensor, data relating to the person and/or to their thermal environment, this sensor being in particular a camera designed to acquire an image of the person and/or of their thermal environment, b. evaluating, on the basis of these acquired data, the probability of the state characteristic adopting a first value by associating a first confidence level with this first value, c. evaluating, on the basis of these acquired data, the probability of the state characteristic adopting a second value by associating a second confidence level with this first value, d. assigning, to the state characteristic, an adjusted value that is a function of at least said first and second values and said associated confidence levels.

The invention and its various applications will be better understood upon reading the following description and with reference to the accompanying figures, in which:

FIG. 1 schematically illustrates a thermal comfort management system according to one non-limiting embodiment of the invention.

FIG. 1 shows a system 1 for managing the thermal comfort of a person on board a motor vehicle, this system comprising multiple sensors including:

a DMS (Driver Monitoring System) camera 3 designed to observe a passenger in the passenger compartment, one or more domes 4 comprising one or more cameras operating in the visible (RGB) and/or near infrared (NIR) and/or far infrared (FIR) spectrum, placed on a ceiling of the passenger compartment and making it possible to view walls of the passenger compartment and certain body parts of the passengers, an outdoor temperature sensor and an insolation sensor 5, at least one air temperature sensor 6 at the outlet of an air conditioning device or of the HVAC 10, at least one sensor for detecting the air flows and their distribution at the outlet of an air conditioning device or of the HVAC 10, at least one sensor 7 for sensing the air temperature prevailing in the passenger compartment, preferably a humidity sensor and temperature sensors arranged in certain walls of the passenger compartment, preferably a sensor for sensing the heat flow in areas in contact with the passengers.

The system 1 is designed to use at least one state characteristic of the person and/or of their thermal environment, this characteristic being able to adopt a plurality of values, these values being discrete or continuous, this system comprising a processing unit 2 designed to:

a. acquire, using one of the sensors mentioned above, data relating to the person and/or to their thermal environment, this sensor being in particular a camera designed to acquire an image of the person and/or of their thermal environment, b. evaluate, on the basis of these acquired data, the probability of the state characteristic adopting a first value by associating a first confidence level with this first value, c. evaluate, on the basis of these acquired data, the probability of the state characteristic adopting a second value by associating a second confidence level with this first value, d. assign, to the state characteristic, an adjusted value that is a function of at least said first and second values and said associated confidence levels.

The system 1 is designed to assign the state characteristic (E) a value, in particular a continuous value, which is a function of values $g(Ai)$ adopted for each value or category (Ai) of another state characteristic (A), weighted by the overall confidence level $Prob(Ai)$ associated with this value or category (Ai). For example, it is possible to have the formula $E=f([\Sigma i(Prob(Ai)*g(Ai))/\Sigma i\ (Prob(Ai))], Bk\ ...\ )$, where f is a model or algorithm and Bk is one or more other characteristics.

According to one of the aspects of the invention, the system 1 is designed to assign the state characteristic (E) a value that is a function of values (Ei) adopted by E for each value or category (Ai) of another state characteristic (A), weighted by the overall confidence level $Prob(Ai)$ associated with this value or category (Ai). For example, it is possible to have the formula $E=\Sigma i(Prob(Ai)*f(g(Ai), Bk))/\Sigma i(Prob(Ai))$, where f is a model or algorithm and Bk is one or more other characteristics, and $Ei=f(g(Ai), Bk)$, $g(Ai)$ is in particular a discrete value.

For example, the state characteristic is the metabolism level MET of the passenger, this level MET being equal to 60%, this being the confidence level, of the level MET defined for a Male and 40% of the level MET defined for a Female.

In one example, the state characteristic RClo is the level of clothing coverage of the arms of the passenger, the level RClo being equal to 50% of a level RClo associated with a long-sleeved garment and 50% of a level RClo associated with a short-sleeved garment and 0% of a level associated with bare arms.

In one example, the state characteristic is the wellbeing level of the passenger, this wellbeing level being equal to 50%, which is the confidence level, of an "Angry" level, 0% of a "Happy" level, 30% of a "Scared" level and 20% of an "Anxious" level. In this case, the state characteristic may adopt four possible categories.

In one exemplary embodiment of the invention, the system 1 comprises a plurality of measurement chains for determining values of the state characteristic, each measurement chain being designed to give values for the state characteristic with an associated confidence level $(Prob(Aij))$ such that the system assigns each value (Ai) an overall confidence level $(Prob(Ai))$ that is a function of the confidence levels $(Conf(Cj))$ specific to each measurement chain and of the confidence levels $(Prob(Aij))$ associated with each value (Aij) given by the measurement chain. The overall confidence level $(Prob(Ai))$ may thus be expressed as follows: $Prob(Ai)=\Sigma j[Conf(Cj)*Prob(Aij)]/\Sigma j[Conf(Cj)]$. If the values (Aij) of the characteristic (A) are numerical and continuous, the value (A*) assigned to the state characteristic (A) may then be expressed by $A*=\Sigma i(Prob(Ai)*Ai)/\Sigma (Prob(Ai))$.

The thermal management takes into account the above values weighted by the confidence levels, in particular so as to activate thermal actuators, such as for example the HVAC or radiant panels in the vehicle.

The invention claimed is:

1. A system for managing the thermal comfort of a person on board a motor vehicle, the system being configured to use at least one state characteristic of the person and/or of their thermal environment, and the characteristic being able to adopt a plurality of values, the system comprising:

a sensor for acquiring data relating to the person and/or to their thermal environment, the sensor comprising a camera configured to acquire an image of the person and/or of their thermal environment;

wherein the system is configured to:

evaluate, on the basis of the acquired data, the probability of the state characteristic adopting a first value by associating a first confidence level with the first value;

evaluate, on the basis of the acquired data, the probability of the state characteristic adopting a second value by associating a second confidence level with the first value; and assign, to the state characteristic, an adjusted value that is a function of at least said first and second values and said associated confidence levels.

2. The system of claim 1, wherein the state characteristic is a characteristic that may adopt multiple values, each value corresponding to a category chosen from among a plurality of categories.

3. The system of claim 1, wherein the state characteristic is a gender of the passenger that may adopt a value corresponding to a Male category and a value corresponding to a Female category.

4. The system of claim 1, wherein the system is configured to determine a confidence level for each possible value of the state characteristic using one or more neural networks of the system, or a Bayesian network of the system, or any other sensor and processing algorithm.

5. The system of claim 1, wherein the system comprises at least one measurement chain comprising the sensor, an acquisition unit, and a processing unit running an algorithm, said at least one measurement chain being designed to provide, for the state characteristic, values corresponding to categories, and confidence levels respectively associated with these values.

6. The system of claim 5, wherein the system is configured to assign the at least one measurement chain a confidence level specific to the at least one measurement chain, said confidence level reflecting the reliability of the at least one measurement chain to give a reliable result.

7. The system of claim 5, further comprising:

a plurality of measurement chains for determining values of the state characteristic, each measurement chain being configured to give values for the state characteristic with an associated confidence level (Prob(Aij)) such that the system assigns each value (Ai) an overall confidence level (Prob(Ai)) that is a function of the confidence levels (Conf(Cj)) specific to each measurement chain and of the confidence levels (Prob(Aij)) associated with each value (Aij) given by each measurement chain.

8. The system of claim 7, wherein the system is configured to assign the state characteristic a continuous value (E*), which is a function of values g(Ai) adopted for each value or category (Ai) of another state characteristic (A), weighted by the overall confidence level Prob(Ai) associated with each value or category (Ai), wherein $E^* = f([\Sigma i \, (Prob(Ai) * g(Ai) / \Sigma i \, (Prob(Ai))], Bk)$, where f is a model or algorithm and Bk is one or more other characteristics.

9. The system of claim 1, wherein the system is configured to assign the state characteristic a value (E*) that is a function of values (Ei) adopted by E for each value or category (Ai) of another state characteristic (A), weighted by the overall confidence level Prob(Ai) associated with each value or category (Ai), wherein $E^* = \Sigma i \, (Prob(Ai)) * f(g(Ai), Bk)) / \Sigma i \, (Prob(Ai))$, where f is a model or algorithm and Bk is one or more other characteristics, and $Ei = f(g(Ai), Bk)$, $g(Ai)$ being a discrete value.

10. A method for managing the thermal comfort of a person on board a motor vehicle, the method using at least one state characteristic of the person and/or of their thermal environment, the state characteristic being able to adopt a plurality of values, the method comprising:

acquiring, using a sensor, data relating to the person and/or to their thermal environment, the sensor being a camera configured to acquire an image of the person and/or of their thermal environment;

evaluating, on the basis of these acquired data, the probability of the state characteristic adopting a first value by associating a first confidence level with the first value;

evaluating, on the basis of these acquired data, the probability of the state characteristic adopting a second value by associating a second confidence level with the first value; and assigning, to the state characteristic, an adjusted value that is a function of at least said first and second values and said associated confidence levels.

* * * * *

UNITED STATES PATENT AND TRADEMARK OFFICE
CERTIFICATE OF CORRECTION

PATENT NO. : 11,938,786 B2
APPLICATION NO. : 17/603468
DATED : March 26, 2024
INVENTOR(S) : Daniel Neveu et al.

Page 1 of 1

It is certified that error appears in the above-identified patent and that said Letters Patent is hereby corrected as shown below:

In the Specification

At Column 2, Line number 10, in step c, replace "first" with "second".

At Column 5, Line number 10, in step c, replace "first" with "second".

At Column 5, Line number 61, in step c, replace "first" with "second".

In the Claims

At Column 7, Claim number 1, Line number 3, replace "first" with "second.".

At Column 8, Claim number 10, Line number 36, replace "first" with "second.".

Signed and Sealed this
Sixteenth Day of July, 2024

Katherine Kelly Vidal
*Director of the United States Patent and Trademark Office*